(12) United States Patent
Albrecht et al.

(10) Patent No.: US 8,187,682 B2
(45) Date of Patent: May 29, 2012

(54) PROTECTIVE GLASS AGAINST IONIZING RADIATION

(75) Inventors: Bernd Albrecht, Delligsen (DE); Daniel Grimm, Stadecken-Elsheim (DE); Angelika Ullmann, Coppenbrügge (DE); Marten Walther, Alfeld (DE); Ernst-Friedrich Düsing, Alfeld (DE); Horst Schillert, Grüneplan (DE); Matthias Anton, Einbeck (DE); Peter Kracht, Holzminden (DE); Stephen Reimann, Grünenplan (DE); Susanne Buchner-Nagel, Kaierde (DE)

(73) Assignee: Schott AG, Mainz (DE)

( * ) Notice: Subject to any disclaimer, the term of this patent is extended or adjusted under 35 U.S.C. 154(b) by 643 days.

(21) Appl. No.: 12/205,147

(22) Filed: Sep. 5, 2008

(65) Prior Publication Data
US 2009/0068455 A1 Mar. 12, 2009

(30) Foreign Application Priority Data

Sep. 6, 2007 (DE) .......... 10 2007 042 244
Feb. 19, 2008 (DE) .......... 10 2008 009 774
Feb. 19, 2008 (DE) .......... 10 2008 009 776
Feb. 19, 2008 (DE) .......... 10 2008 009 777

(51) Int. Cl.
*B32B 17/06* (2006.01)
*C03C 3/087* (2006.01)
*C03C 3/07* (2006.01)
(52) U.S. Cl. .......... 428/34; 428/432; 501/71; 501/74
(58) Field of Classification Search .......... 501/71, 501/74; 428/428, 432, 34
See application file for complete search history.

(56) References Cited

U.S. PATENT DOCUMENTS

| | | | |
|---|---|---|---|
| 2,747,105 A | 11/1951 | Fitzgerald et al. | |
| 2,597,562 A * | 5/1952 | Blodgett .......... | 428/336 |
| 2,736,714 A | 2/1956 | Tiede | |
| 5,073,524 A | 12/1991 | Speit | |
| 6,001,487 A | 12/1999 | Ladang et al. | |
| 6,055,088 A | 4/2000 | Fix et al. | |
| 6,222,604 B1 * | 4/2001 | Suginoya et al. .......... | 349/158 |
| 2005/0117193 A1 | 6/2005 | Poll et al. | |
| 2006/0119571 A1 | 6/2006 | Scheuering | |

FOREIGN PATENT DOCUMENTS

| | | |
|---|---|---|
| DE | 8813608.6 | 2/1989 |
| DE | 42 28 927 A1 | 10/1993 |
| DE | 10043141 A1 | 3/2002 |
| DE | 10101100 A1 | 7/2002 |
| DE | 10118617 A1 | 11/2002 |
| EP | 0343419 A2 | 11/1989 |
| EP | 0 913 446 A1 | 6/1999 |
| JP | 07055995 A | 3/1995 |
| WO | WO 2005 080279 A1 | 9/2005 |

OTHER PUBLICATIONS

Glastec Rosenheim: "Rontgenschutzglas" Oct. 21, 2007, www.glastec.com/de/roentgenschutzglas.php.
Glastec Rosenheim, "Screenline" Oct. 21, 2007, www.glastec.com/de/screenline.php.

\* cited by examiner

*Primary Examiner* — Gwendolyn Blackwell
(74) *Attorney, Agent, or Firm* — Taylor IP, P.C.

(57) ABSTRACT

An element, particularly a transparent element, including at least one glass element, configured as a protective glass against ionizing radiation and/or UV radiation, wherein at least a portion of the surface of the glass element is covered by a film that includes a substance that can be switched into at least two states.

16 Claims, 3 Drawing Sheets

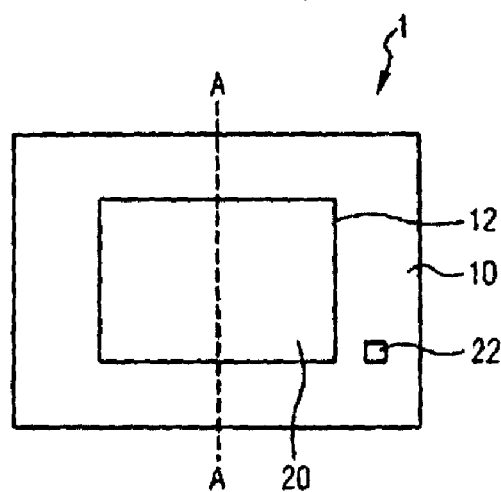
Fig.1a
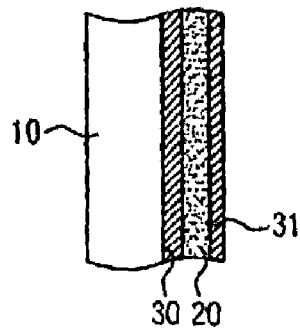
Fig.1b.1
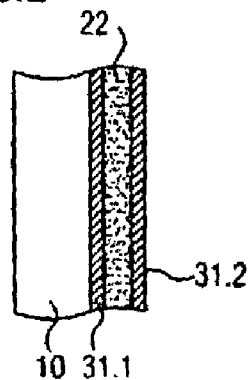
Fig.1b.2
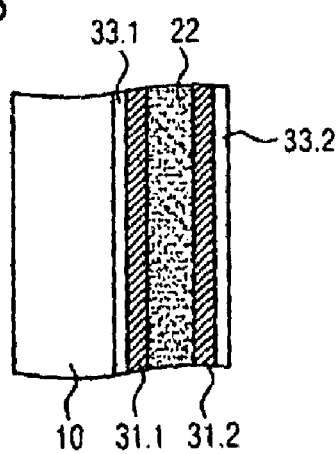
Fig.1b.3

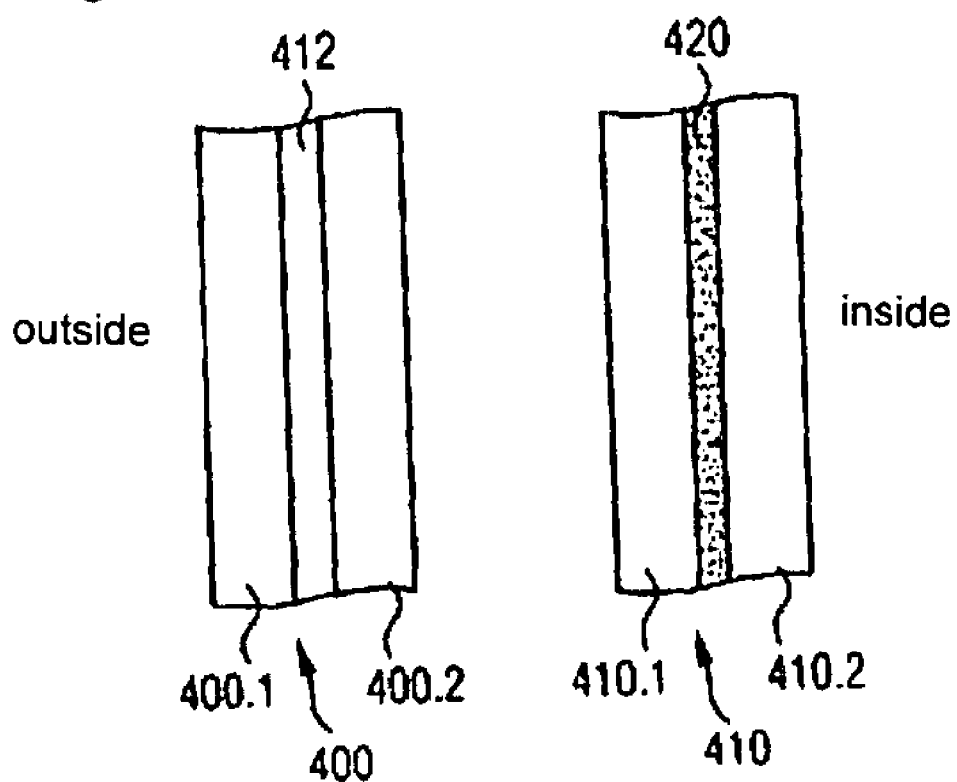

PROTECTIVE GLASS AGAINST IONIZING RADIATION

BACKGROUND OF THE INVENTION

1. Field of the Invention

The present invention relates to an element, particularly a transparent element, with at least one glass element, which is configured as protective glass against ionizing radiation and/or UV radiation.

2. Description of the Related Art

From the state of the art, for example from Schott AG Online Magazine Info 96 Röntgenschutzglas on the home page: http://www.Schott.com/magazine/German/Info96 and the home page of Glastech Rosenheim-Rosenheimer Glastechnik GmbH, Neue Straβe 9, 83071 Stephanskirchen, Germany, X-ray protective glass became known. In this respect, reference is made to the home page: http://www-.glastech.com/de/Röntgenschutzglas.php. X-ray protective glass, for example of the RD 50 and RD 30 types from Schott AG in Mainz, Germany, is used as protective glass against ionizing radiation, such as X-ray and gamma rays. The RD 50 and RD 30 X-ray protective glass types are characterized by a high lead oxide content of more than 65 percent by weight and more than 22 percent by weight, respectively.

Such X-ray protective glass is used particularly in clinics. The X-ray protective glass mentioned above is used particularly to enable monitoring of the X-ray room from the outside. This type of glass is also used in operating rooms, radiation stations, dental practices, laboratories and in material testing. Examples of such applications are observation and communication windows, door glazing, panorama glazing, mobile radiation protection walls or protective panes for examiner protection systems. The use thereof in mammography devices is also possible.

In order to enable visual protection when using such types of glass, according to the state of the art it was necessary to arrange a separate mechanical visual protection device in an intermediate pane space, for example in a laminated insulating glass or in front of the glass. Such a device had the disadvantage of a very complex production process. Furthermore, such a system is always very maintenance intensive.

What is needed in the art is a transparent element which offers protection against ionizing radiation and sufficient visual protection without the use of an additional complex device.

SUMMARY OF THE INVENTION

The present invention provides a glass element, designed to protect against ionizing radiation and/or UV radiation, at least a portion of the surface of the glass element being covered by a film comprising a substance that can be switched into at least two states, namely, a transparent state and a substantially non-transparent state. As a result of such a design, it is no longer necessary to provide the transparent protective glass pane with a separate device, for example, blinds that can be opened and closed, in order to prevent a view through the glass pane.

The glass element, configured as protective glass against ionizing radiation and/or UV radiation, is preferably an X-ray protective glass having a very high lead content of more than 20% by weight, particularly more than 50% by weight, preferably more than 60% by weight, more preferably more than 65% by weight, and particularly preferred more than 70% by weight. X-ray protective glass of this type then has a very high absorption rate for ionizing radiation and high transmission for visible light. For example, the light transmission level of the RD 30 X-ray protective glass from Schott AG in Mainz, having a lead content of $\geqq 22\%$ by weight and a thickness of 6 mm, is 90.5% and the light transmission level for visible light of the RD 50 X-ray protective glass, having a lead content of $\geqq 65\%$ by weight and a thickness of 5 mm, is 85%.

The glass element configured as protective glass against ionizing radiation is preferably produced as a single pane. The thickness of the single panes for protective glass preferably ranges between 4 and 25 mm, with the range between 4 and 10 mm being more preferred. In the range of an X-ray voltage of 40 kV to 200 kV of an X-ray tube, the X-ray protective glass has a lead equivalent value of 0.5 mm to 7 mm. A lead equivalent value is the thickness of a lead plate that provides an equivalent protective effect as the protective glass. Of course the single panes having a thickness between 4 and 25 mm can be combined into laminated glass made of a plurality of panes in order to achieve a higher protective effect for lead equivalent values. The protective effect then increases accordingly. A liquid crystal material is preferably used as the substance that is easily switchable between two states, which is to say a transparent state and a non-transparent state.

Liquid crystal materials are materials or substances, having liquid properties on the one hand, and anisotropic physical properties on the other hand, equivalent to a crystal. The prerequisite for forming liquid crystal phases is the anisotropy of the units forming them. Liquid crystals, for example, may have a rod-shaped molecule shape. With respect to liquid crystals, reference is made to the article "Flüssigkristalle im Überblick: Unentbehrlich in Natur, Technik und Forschung (An overview of liquid crystals: Indispensable in nature, technology and research)" in: Physik in unserer Zeit 34, No. 3, 2003, pgs. 134-135. The disclosure content of this publication is hereby included to the full extent in the present application.

In one embodiment of the invention, a switchable film may be coated with tiny liquid crystals. The liquid crystals of the film are first completely disordered, resulting in an opaque appearance of the film in transmission. The individual liquid crystals are scattering centers in such a case.

By applying a voltage to electrodes, the very small liquid crystals can be ordered. Due to the supply of energy, in this example electric energy, a phase transition occurs from a disordered phase into an ordered phase. As the small crystals become arranged, the film that was opaque in transmission in the disordered state becomes transparent in the range of visible wavelengths, which is to say between 380 nm and 780 nm, particularly between 420 nm and 780 nm. In order to switch the film from the ordered transparent state into a disordered state, the voltage is removed from the electrode. The film then appears milky and opaque again. Alternatively to a film coated with liquid crystals, it is also possible to select a structure in which a polymer matrix comprising liquid crystals is introduced between two polyester films. The two polyester films are transparent and coated with an electrically conductive layer. The sandwich design comprising two electrically conductively coated polyester films and an interposed polymer matrix comprising liquid crystals can be referred to as liquid crystal packaging. The light transmission level in the range of the visible light of such liquid crystal packaging ranges between more than 70% for visible light and the transparent, which is to say the ordered state, and less than 65% for visible light for the opaque, which is to say the disordered state.

In addition to, or instead of, the polyester films, it is also possible to use polarization films. The liquid crystal substance present between the polarization films is then switched from one polarization state to another. Depending on how the polarization films are positioned in relation to the liquid crystal in the respective polarization state, the transparent substance will appear transparent or not transparent. Switching from one state to another occurs with little energy consumption. In one embodiment of the invention, the supply of power to the switchable films can occur via bus bars at the edge of the pane.

Alternatively, it is also conceivable to coat the glass element, which covers the film at least partially, with an electrically conductive layer, for example a transparent coating. To this end, particularly coatings having metal oxides, such as ITO ($InO_x$: Sn), $SnO_x$: F, $SnO_x$: Sb, $ZnO_x$: Ga, $ZnO_x$: B, $ZnO_x$: F, $ZnO_x$: Al, $Ag/TiO_x$ are possible.

The metal oxides of the type mentioned above are transparent and therefore do not interfere with the transmission of the pane in the visible wavelength range. If not the entire pane, but only regions thereof are to be switched, it is possible to structure appropriate layers, for example by means of a laser. The switching can then occur in the desired regions by applying a current in said regions.

The switchable film that includes the liquid crystals is preferably integrated between at least two glass panes. Accordingly, in one embodiment, the element according to the present invention includes not only the glass element, which is configured as protective glass against ionizing radiation and/or UV radiation, but also an additional glass element, wherein the film may be introduced between the glass element, which is configured as protective glass, and the additional glass element, resulting in a laminated glass element.

The additional glass element may be a protective glass, which is used against ionizing radiation. Any type of glass pane may be used as the additional glass element in the laminate, depending on the application purpose of the laminated glass pane. It is possible, for example, to use regular sheet glass, or a single pane having a highly anti-reflective coating, such as an anti-reflective Amiran® single pane from Schott AG Mainz. In the case of an anti-reflective single pane, the sheet glass pane is provided with an interference layer, which has residual reflection of only about 1% and thus reduces reflection to ⅛ compared to glass not provided with anti-reflective coating. It is also possible to provide the protective glass against ionizing radiation with an anti-reflective coating.

As an additional glass in the laminate, any arbitrary glass, for example, a glass having integrated UV protection, or a heat protection glass having a heat-protective coating may be used. A single-pane safety glass can also be used as the additional glass element, for example, a laminated safety glass. The glass pane does not have to be flat, but can be curved. The glass of the additional glass element may be thermally prestressed or screen-printable. Alternatively to an anti-reflective glass, a color effect glass may also be used as the additional glass, for example, a color effect glass based on optical interference layers, such as the Narima® glass from Schott AG. In addition to color effect glass based on optical interference effects, it is also possible to use body-tinted colored glass, such as the Artista® glass from Schott AG having a structured surface on one side, or colored glass, such as the Imera® glass having a structureless surface, and highly transparent colorless sheet glass having a structured surface.

As described above, the additional glass element may be covered with an electrically conductive coating, for example a metal oxide coating, which is transparent, for example an ITO ($InO_x$: Sn), $SnO_x$: F, $SnO_x$: Sb, $ZnO_x$: Ga, $ZnO_x$: B, $ZnO_x$: F, $ZnO_x$: Al, $Ag/TiO_x$ layer. If voltage is applied to these layers, the liquid crystals in the film can be switched from one ordered state to another. The liquid crystal film can thus be switched from a scattering, which is to say opaque state, into a transparent, which is to say transmissive state, and vice versa. In particular, the liquid crystals can be switchably integrated in a polymer matrix.

The glass element, which is configured as protective glass against ionizing radiation and/or UV radiation, may also be part of an insulating glass element. The insulating glass element includes, a single pane, which is designed as protective glass against ionizing radiation and/or UV radiation, and a glass element disposed on the opposite side of the laminated insulating glass, for example, a laminated glass element, into which a film with liquid crystals is laminated. Such an arrangement also corresponds to the idea of the invention, since in such an arrangement due to the fixed distance between the glass element, which is configured as protective glass against ionizing radiation and/or UV radiation, and the opposing laminated glass element comprising the switchable film, at least a portion of the glass element configured as protective against ionizing radiation and/or UV radiation is at least partially covered. The glass element, which in the laminated insulating glass is spaced from the glass element configured as protective glass against ionizing radiation, may in turn comprise a plurality of possibilities. For example, the spaced glass element may comprise a single pane, an anti-reflective pane, a laminated glass pane, a decorative glass pane, a color effect glass, a heat protection glass or a sun protection glass. The distance between the at least one element and the additional glass pane disposed at a distance thereto is preferably between 5 mm and 50 mm, more preferably 10 mm to 30 mm.

In the case of an insulating glass element, a fill gas is introduced between the two panes, for example a noble gas, such as argon, having a gas fill level of 95%, for example.

The element according to the invention may be used, for example, in X-ray rooms, operating rooms, radiation stations, dental practices and laboratories in material testing. The elements may be used as observation and communication windows, door glazing, panorama glazing, mobile radiation protection panes, protective panes for examination systems, for example integrated in mammography devices and as viewing glass for protective goggles.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 1a-1b.3 show an embodiment of an element according to the present invention;

FIG. 4 illustrates the use of an element according to the present invention as laminated glass in an insulating glass element.

Corresponding reference characters indicate corresponding parts throughout the several views. The exemplifications set out herein illustrates embodiments of the invention, in one form, and such exemplifications are not to be construed as limiting the scope of the invention in any manner.

DETAILED DESCRIPTION OF THE INVENTION

Figure 2:
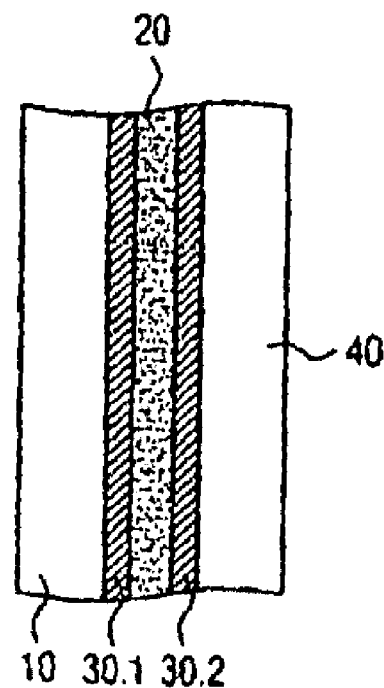
FIG. 2 illustrates an embodiment of an element according to the present invention, configured as laminated glass.

Referring now to the drawings, and more particularly to FIGS. 1a-4, there is shown in FIG. 1a a top view of element 1 according to the present invention. The element according to the present invention is configured as a disk. In region 12, film 20 including liquid crystals is applied to glass element 10. As a result, the disk is partially covered by the film.

There is shown in FIG. 1b. 1 an embodiment of element 1 according to the present invention, shown in a sectional view along the line A-A according to FIG. 1a. Glass element 10 is configured as protective glass against ionizing radiation and/or UV radiation. Glass element 10 is preferably a so-called X-ray protective glass, such as the X-ray protective glass of the RD 50 or RD 30 type from Schott AG, Mainz, Germany, which offers protection against ionizing X-ray and gamma rays. With such glass, lead equivalent values, which describe the equivalent of the protective action of the glass to a lead plate having the same thickness, of 0.5 mm Pb to 8 mm Pb can be achieved, depending on the tube voltage of the high-voltage tube producing the X-rays. The glass thickness of such X-ray protective glass ranges between 4 mm and 25 mm, preferably between 5.0 and 22.0 mm.

In an embodiment of the present invention according to FIG. 1b.1, at least part of X-ray protective glass 10 may be covered by film 20, which is coated with tiny liquid crystals. In a starting state, these liquid crystals are completely disordered at room temperature, as a result of which the film appears opaque in transmission. In order to switch film 20 into a transparent state, it is supplied with voltage so that the liquid crystals become ordered. This can occur, for example, in that X-ray protective glass pane 10 is provided with a transparent, conductive coating, such as metal oxide coating 30, and that film 20 arranged on the side opposite film 31 is enclosed with a conductive coating, for example a polyester film having a conductive coating. The metal oxide layers are preferably layers made of one or more of the following metal oxides:

$InO_x$: Sn
$SnO_x$: F
$SnO_x$: Sb
$ZnO_x$: Ga
$ZnO_x$: B
$ZnO_x$: F
$ZnO_x$: Al
$Ag/TiO_x$

For example, using immersion techniques, the metal oxides are coated across the entire surface, such as in a sol-gel process. Then, particularly if not the entire region of the glass pane is supposed to be switched completely, the metal oxide layers can be structured, for example, by using a laser. The laser heats the coating locally and evaporates it. The conductive layers are preferably configured such that in the range of the laser wavelength of the laser used they have high absorption, while the substrate, in this example the protective glass, is transmissive at these wavelengths. With such a system it is then ensured that the glass layer that is applied to the transparent conductive layer has only small damage in the structuring, and cracking is substantially prevented in such systems.

The conductive coatings are preferably so-called highly conductive coatings having resistance $R\square \leq 15$ ohm/$\square$ (ohm/square), preferably $\leq 10$ ohm/$\square$, particularly $\leq 9$ ohm/$\square$, more preferred $\leq 7$ ohm/$\square$, and particularly preferred $\leq 5$ ohm/$\square$. The layer thickness of the transparent coatings, particularly of the highly conductive coatings, is preferably more than 150 nm, particularly more than 180 nm, particularly preferred more than 280 nm, more preferred more than 500 nm, and most preferred more than 550 nm.

If a voltage is applied between metal oxide layer 30 and conductive film 31 comprising the conductive coating, due to the applied voltage the liquid crystals of film 20 become oriented. Film 20 will then appear transparent.

In another embodiment of the invention according to FIG. 1b.2, the liquid crystal is introduced in polymer matrix 22. Polymer matrix 22, which is the liquid crystal is located between two films 31.1 and 31.2 having an electrically conductive coating. For example, these can be polyester films having an electrically conductive coating. By applying a voltage to the electrodes formed by the electrically conductive coating, the liquid crystals present in the polymer matrix can be transferred from a disordered, non-transparent state into an ordered, transparent state.

If the voltage is removed from the electrodes, which is to say the conductive coatings, between which polymer matrix 22 is disposed, the liquid crystals return to the disordered state again and the pane will appear opaque.

FIG. 1b.3 shows another embodiment of the present invention. In FIG. 1b.3, again a liquid crystal is embedded in polymer matrix 22. Liquid crystal 22, present in the polymer matrix, is introduced between two films having conductive coatings 31.1 and 31.2, for example polyester films. Films 31.1 and 31.2 serve as electrodes. In addition, polarization films 33.1 and 33.2 are provided on films 31.1 and 31.2, serving as electrodes.

The liquid crystal in polymer matrix 22 is then switched from a liquid crystal phase into another. If the liquid crystals in the first liquid crystal phase are arranged such that the polarization thereof crosses with the polarization direction of the films 33.1 and 33.2, the liquid crystal film will appear dark. If due to the voltage applied to the conductive coating 31.1 and 31.2 the liquid crystal is switched into another polarization state, which is parallel to that of polarization films 33.1 and 33.2, polymer matrix 22 will appear transparent.

In general, one will find that due to the switching action the liquid crystal is moved to a structure in which the film appears transparent, and that the liquid crystal maintains this structure until the voltage is removed from the electrodes. If no voltage is applied any longer, in an embodiment of the present invention this may result in the liquid crystal structure of the film transitioning from an ordered transmissive state into a disordered state, thus making the film appear opaque again. If the opaque film is supposed to appear transparent again, voltage is applied and the order of the liquid crystals is changed. In order to maintain the order of the liquid crystal, generally almost no energy is required. The power consumption is less than 5 Watt/$m^2$, preferably less than 3 Watt/$m^2$. Consequently, the glass can be very effectively switched from a transmissive element into an opaque element, and vice versa, and this can be done with relatively short switching times, such as less than 10 seconds, particularly less than 1 second at room temperature. Instead of liquid crystals, the switchable film may also comprise electrochromic substances. With electrochromic substances, by applying a voltage the film can be switched from a transparent lightened state into a darkened state, typically in a dark blue color.

Furthermore, it is possible to cover only part of the surface of the X-ray protective pane with a transparent film. The ITO layer can then be structured accordingly. Then it would be possible to apply the control elements directly on the X-ray protective pane, or the glass, on the edge regions. FIG. 1a shows control element 22. Conductive surface 30 then extends beyond region 18 and is separated from the conductive surface in region 30, for example, with lasers. Instead of, or in addition to, the control it is also possible to provide lamps outside region 18. In a configuration of this type, external control would no longer be necessary. Furthermore, in the regions that are coated with an electrically conductive film, but not covered by a switchable film, lamps may be provided, as mentioned above, for example light-emitting diodes. These light-emitting diodes can then be controlled in the unused part via the conductive layer, producing letters or information, for example.

In addition, it would be possible to arrange a scattering film in the unused region of the X-ray protective glass not covered by the liquid crystal film, wherein the scattering film then could serve as a projection film, for example, on which the corresponding information, or also images, can be depicted with the help of backward or forward projection.

Referring now to FIG. 2 which shows a laminated glass design, wherein liquid crystal film 20 is laminated between X-ray protective pane 10 and another glass pane, which is to say another glass element 40. Film 10, in turn, is a film that includes liquid crystals, as described above, and can be switched from one state into another state. Conductive layers 30.1 and 30.2 made of metal oxide are applied both to X-ray protective pane 20 and to additional glass pane 40. These two conductive layers 30.1 and 30.2 then act like two electrodes for the liquid crystals in film 20. The switching of liquid crystals embedded between two electrodes is sufficiently known from the field of liquid crystal monitors. Additionally, glass pane 40 can be a single-pane glass, a single-pane safety glass, a partially prestressed single-pane glass, a laminated safety glass, a laminated safety glass comprising a single-pane safety glass, or a laminated safety glass comprising a partially prestressed glass.

Furthermore, additional glass element 40 may be a coated pane, for example, an anti-reflective pane, such as the AMIRAN® glass panes from Schott AG, Mainz, a body-tinted color effect glass such as ARTISTA® or IMERA® from Schott AG with structured or unstructured surface, or a color effect glass such as NAMIRA® from Schott AG with interference coating. Heat protection glass and sun protection glass are conceivable as well. Heat protection glass or sun protection glass is characterized by high light transmission of daylight, low overall energy transmission to prevent considerable heating and high thermal insulation to prevent heat loss. Thermal insulation layers, or sun protection coatings, are disclosed in "Dünnfilmtechnologie auf Flachglas (Thin-film technology on sheet glass)", by Hans-Joachim Gläser, Karl Hoffmann publishing company, 1999, pgs. 173-199. The disclosure content of this publication is hereby included to the full extent in the present application.

In particular, an electrically conductive layer based on an $SnO_2$:F coating also constitutes a thermal insulation layer. A coating made of such a material thus has both conductive properties and a heat insulation function. The $SnO_2$:F coatings are also referred to as hard coatings.

Figure 3:
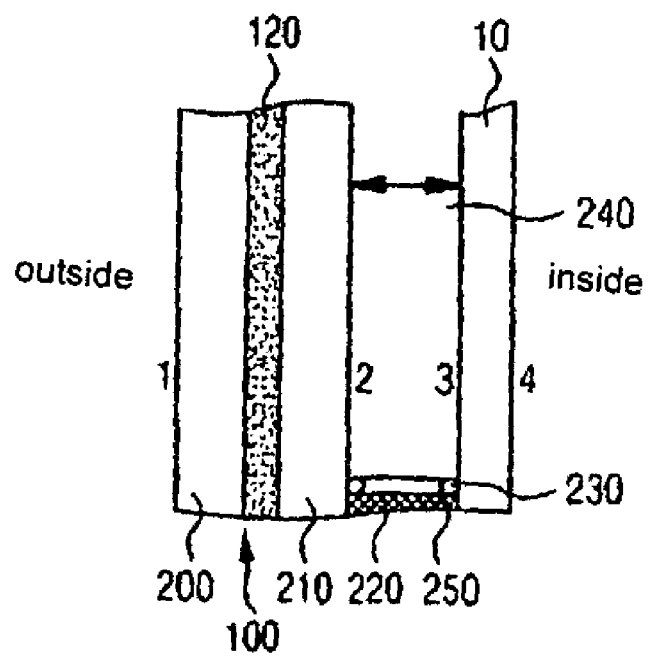
FIG. 3 illustrates another embodiment of an element according to the present invention, configured as laminated insulating glass.

The element according to the present invention can also be used in an insulating glass element. Referring now to FIG. 3, there is shown such an insulating glass element. The insulating glass element according to FIG. 3 is made of X-ray protective pane 10 and laminated glass element 100. Laminated glass element 100 can be a conventional laminated glass element, or also one in which film 120 comprising liquid crystals is laminated into the laminated glass element between the two panes. The two panes of laminated glass element 100 are denoted with reference numerals 200 and 210. Distance A between the two elements that form the insulating glass element ranges between 5 and 50 mm, preferably between 10 mm and 30 mm, particularly it is 16 mm. The distance of laminated glass element 100 and X-ray protective pane 210 of the insulating glass element is maintained by metal piece 220, preferably made of aluminum. Spacer piece 220 is sealed in relation to disk-shaped elements 100, 10, specifically with the help of sealing material 230, which is preferably made of butyl rubber. Complete sealing of intermediate space 240 between first 100 and second 10 disk-shaped element is achieved by butyl rubber 250 that is applied beneath spacer element 220. Between the first and second disk-shaped elements, preferably a gaseous medium is present. Particularly, a noble gas medium is used if increased thermal demands exist. The noble gas medium may include the elements argon or xenon or krypton.

Laminated element 100, into which film 120 comprising the liquid crystals is laminated, may be provided with a conductive coating, for example made of a metal oxide, on both panes. For panes 200 and 210, different compositions are conceivable. For example, a heat protection layer, or a sun protection layer, may be applied to surface 2 of pane 210. The heat or sun protection layer is applied onto surface 2 toward the inside of the laminated insulating glass. FIG. 3 shows the conventional descriptions of the surfaces of a laminated insulating glass. Outside denotes the outer surface of the insulating glass pane, and inside denotes the inner surface. Surface 1 and surface 2 are the surfaces of the outer pane; surfaces 3 and 4 are the surfaces of the pane facing the inside. An anti-reflective coating, for example, an interference anti-reflective coating, may be applied to surface 1 of pane 200. Furthermore, pane 200 is a color effect glass, for example, based on interference layer systems, or a body-tinted color effect glass.

The X-ray protective pane is preferably provided on the inside of the laminated insulating glass, and the laminated safety glass on the outside. The inside is labeled with "inside", the outside with "outside".

Referring now to FIG. 4, there is shown a laminated insulating glass, having two laminated glass elements. Laminated glass element 400 again faces the outside of the laminated insulating glass, element 410 faces the inside. Identical components as in FIG. 3 have been denoted with reference numerals increased by 200. Laminated element 400 is made of panes 400.1 and 400.2, which are put together either with the help of a casting resin or a laminated film, for example, PVB film 412, to form a laminated glass element. The individual panes of the laminated glass element, however, may satisfy different requirements, for example they can be anti-reflective glass or glass with thermal insulation coatings.

The laminated glass elements are also not limited to 2-pane laminated glass; of course 3-pane laminates and laminates comprising even more panes are also possible. Second laminated glass pane 410 is likewise made of at least two panes 410.1, 410.2, which in the present example face the inside. One of these panes is configured as X-ray protective glass according to the present invention, for example, pane 410.2. Film 420 that includes liquid crystals according to the present invention is laminated between panes 410.1 and 410.2. Pane 410.1 can likewise be an X-ray protective glass, or any arbitrary other glass.

The present invention provides an element, which is characterized in that it has at least one glass element, which is configured as protective glass against ionizing radiation, and that parts of this glass element are covered by a film, which is provided with substances, particularly liquid crystals, so that by switching the substances, particularly the liquid crystals, the element can be switched in the visible wavelength range from a transparent state to a substantially nontransparent, for example a scattering, state. Instead of liquid crystals, the substances may also include electrochromic substances. This allows the production of X-ray protective glass, which can be modified in the transmission behavior thereof in a simple manner. Such panes can be used, for example, in clinics in the area of X-ray protective windows, such as for examination rooms in the field of mammography. Compared to conventional designs, they have a significantly simplified form.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An element, comprising:
    a film, said film being a substance switchable into at least two states a transparent state and a substantially nontransparent state;
    at least one glass element having a surface at least partially covered by said film, said glass element being an X-ray protective glass having a lead content of $\geq 60\%$ by weight and a lead equivalent value of 0.5 mm to 7 mm when subjected to an X-ray voltage of 40 kV to 200 kV of an X-ray tube and configured to protect against at least one of ionizing radiation and UV radiation;
    an additional glass element which is a glass pane, said film being positioned between said protective glass and said additional glass element defining a laminated glass element and said glass pane being one of a single pane of glass configured to protect against ionizing radiation, an anti-reflective single pane, a laminated glass pane, a decorative glass pane, a single pane of a color effect glass, a heat protection glass pane and a sun protection glass pane; and
    at least one other glass pane, said at least one other glass pane being positioned at a predefined distance to said at least one glass element, thereby defining an insulating glass element.

2. The element according to claim 1, wherein said lead content is >60% by weight.

3. The element according to claim 2, wherein said lead content is $\geq 65\%$ by weight.

4. The element according to claim 3, wherein said lead content is >70% by weight.

5. The element according to claim 1, wherein said X-ray protective glass has a transmission of $\geq 80\%$ for wavelengths in the visible light range of 420 nm to 780 nm.

6. The element according to claim 1, wherein said at least one glass element is a single pane.

7. The element according to claim 6, wherein said single pane has a thickness of between 4 mm and 25 mm.

8. The element according to claim 7, wherein said thickness is between 4 mm and 10 mm.

9. The element according to claim 1, wherein said substance is an electrochromic substance.

10. The element according to claim 1, wherein said substance is a liquid crystal substance.

11. The element according to claim 10, wherein said liquid crystal substance can be switched from a disordered nontransparent state that scatters visible light into an ordered non-scattering state, and vice versa.

12. The element according to claim 11, further comprising two polarization films, said liquid crystal substance being positioned between said two polarization films, said liquid crystal substance being configured to be switched from a lightened transparent polarization state to a darkened transparent polarization state, and vice versa.

13. The element according to claim 11, wherein said X-ray protective glass further includes a transparent conductive layer.

14. The insulating glass element according to claim 1, wherein said glass pane is one of single pane of glass configured to protect against ionizing radiation, an anti-reflective single pane, a laminated glass pane, a decorative glass pane, a single pane of color effect glass, a heat protection glass pane and a sun protection glass pane.

15. The insulating glass element according to claim 1, wherein said predefined distance between said at least one glass pane and said glass element is between 5 mm and 50 mm.

16. The element according to claim 1, wherein the element is used as protective glass against ionizing radiation in the medical field.

* * * * *